United States Patent
Ferro

(10) Patent No.: US 10,970,950 B2
(45) Date of Patent: Apr. 6, 2021

(54) SYSTEMS AND METHODS FOR ACTIVATING A SECURITY ACTION RESPONSIVE TO PROXIMAL DETECTION AND IDENTIFICATION OF A WIRELESS DEVICE

(71) Applicant: Ademco Inc., Golden Valley, MN (US)

(72) Inventor: Philip Ferro, Setauket, NY (US)

(73) Assignee: Ademco Inc., Golden Valley, MN (US)

( * ) Notice: Subject to any disclaimer, the term of this patent is extended or adjusted under 35 U.S.C. 154(b) by 0 days.

(21) Appl. No.: 16/556,910

(22) Filed: Aug. 30, 2019

(65) Prior Publication Data

US 2021/0065483 A1 Mar. 4, 2021

(51) Int. Cl.
| | |
|---|---|
| *G07C 9/00* | (2020.01) |
| *G06K 7/10* | (2006.01) |
| *G08B 26/00* | (2006.01) |
| *H04W 4/80* | (2018.01) |
| *E05B 47/00* | (2006.01) |

(52) U.S. Cl.
CPC ...... *G07C 9/00309* (2013.01); *E05B 47/0002* (2013.01); *G06K 7/10356* (2013.01); *G07C 9/00571* (2013.01); *G07C 9/00944* (2013.01); *G08B 26/007* (2013.01); *H04W 4/80* (2018.02); *E05B 2047/0095* (2013.01); *G07C 2009/00793* (2013.01)

(58) Field of Classification Search
CPC ............ G07C 9/00309; G07C 9/00571; G07C 9/00944; G07C 2009/00793; G07C 2209/63; G07C 2209/64; E05B 47/0002; E05B 2047/0095; G06K 7/10356; G08B 26/007; H04W 4/80

USPC ........................................................ 340/5.61
See application file for complete search history.

(56) References Cited

U.S. PATENT DOCUMENTS

| | | | | |
|---|---|---|---|---|
| 7,675,402 | B2 * | 3/2010 | Lee ....................... | G08B 25/008 340/5.54 |
| 9,767,632 | B2 | 9/2017 | Johnson | |
| 10,499,363 | B1 * | 12/2019 | Hiscock ................ | H04B 17/27 |
| 2004/0212493 | A1 * | 10/2004 | Stilp ..................... | A01K 11/006 340/531 |
| 2007/0043954 | A1 * | 2/2007 | Fox ....................... | H04L 9/3271 713/185 |

(Continued)

OTHER PUBLICATIONS

Business Wire: Bluetooth Enhances Support for Location Services with New Direction Finding Feature, Jan. 28, 2019, https://www.businesswire.com/news/home/20190128005048/en/Bluetooth-Enhances-Support-Location-Services-New-Direction.

(Continued)

*Primary Examiner* — Edwin C Holloway, III
(74) *Attorney, Agent, or Firm* — Fredrikson & Byron, P.A.

(57) ABSTRACT

Systems and methods for activating a security action responsive to proximal detection and identification of a wireless device are provided. Such systems and methods can include a wireless radio of a door mounted contact sensor of a security system receiving a broadcast message that includes a device identifier from the wireless device. Then, such systems and methods can include determining whether the device identifier corresponds to any of a plurality of authorized devices enrolled with the security system, determining whether a signal parameter of the broadcast message satisfies a preconfigured access condition, and responsive thereto, performing the security action.

16 Claims, 3 Drawing Sheets

(56) References Cited

U.S. PATENT DOCUMENTS

| | | | |
|---|---|---|---|
| 2010/0148918 A1* | 6/2010 | Gerner | G07C 9/00309 340/5.2 |
| 2012/0280783 A1* | 11/2012 | Gerhardt | H04L 63/0428 340/5.6 |
| 2013/0176107 A1* | 7/2013 | Dumas | G07C 9/00571 340/5.61 |
| 2016/0042582 A1 | 2/2016 | Hyde et al. | |
| 2016/0241999 A1* | 8/2016 | Chin | G07C 9/32 |
| 2018/0240292 A1 | 8/2018 | Chen | |

OTHER PUBLICATIONS

Qolsys: Sales Trainin—4 Overview of Bluetooth Disarming, https://www.youtube.com/watch?v=nFlga7-M7gM, Jul. 12, 2018.

* cited by examiner

SYSTEMS AND METHODS FOR ACTIVATING A SECURITY ACTION RESPONSIVE TO PROXIMAL DETECTION AND IDENTIFICATION OF A WIRELESS DEVICE

FIELD

The present invention relates generally to security systems. More particularly, the present invention relates to systems and methods for activating a security action responsive to proximal detection and identification of a wireless device.

BACKGROUND

Known security systems can detect and identify a wireless device whenever the wireless device connects with a wireless receiver of a security system. However, known security systems are not capable of detecting a distance of the wireless device from the wireless receiver or a moving direction of the wireless device based on a broadcast signal from the wireless device received by the wireless receiver. Accordingly, these limitations require known security systems to implement problematic features, such as an entry delay or an indicator that identifies when it is safe to enter a premises protected by the security system.

In view of the above, there is a need and an opportunity for improved systems and methods.

DETAILED DESCRIPTION

Figure 1:
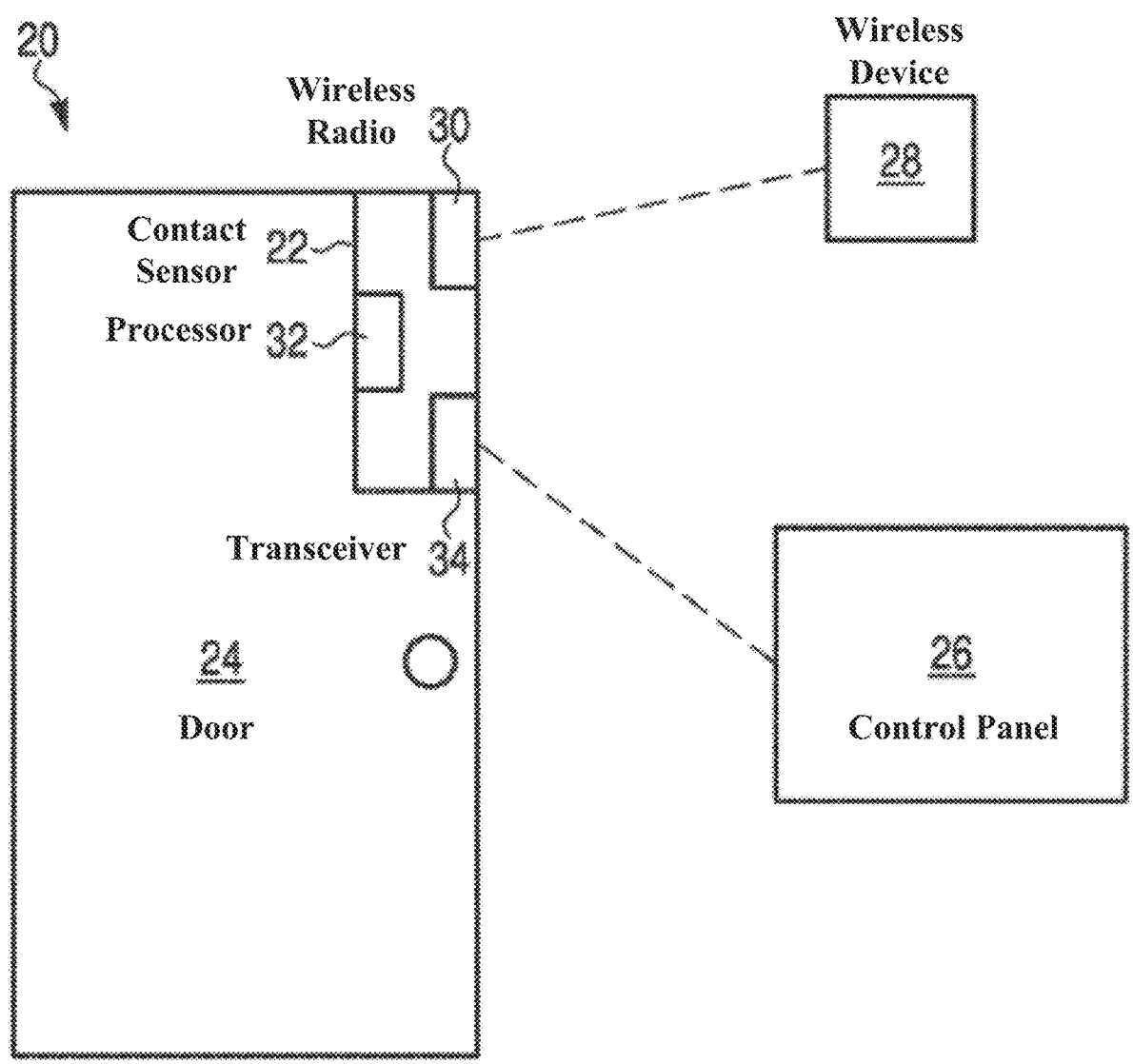
FIG. 1 is a block diagram of a system in accordance with disclosed embodiments.

While this invention is susceptible of an embodiment in many different forms, specific embodiments thereof will be described herein in detail with the understanding that the present disclosure is to be considered as an exemplification of the principles of the invention. It is not intended to limit the invention to the specific illustrated embodiments.

Embodiments disclosed herein can include systems and methods that activate a security action responsive to proximal detection and identification of a wireless device. For example, such systems and methods can include a wireless radio of a door mounted contact sensor of a security system receiving a broadcast message that includes a device identifier from the wireless device. Then, a processor of the door mounted contact sensor can determine whether the device identifier corresponds to any of a plurality of authorized devices enrolled with the security system and whether a signal parameter of the broadcast message satisfies a preconfigured access condition. As described in more detail below, in some embodiments, the signal parameter can include information embedded in the broadcast message or information derived from the analyzing the broadcast message, such as a current moving direction of the wireless device or a current distance of the wireless device from the wireless radio. When both the device identifier corresponds to any of the plurality of authorized devices enrolled with the security system and the signal parameter satisfies the preconfigured access condition, the processor of the door mounted contact sensor can perform the security action.

In some embodiments, the wireless device can include a Bluetooth 5.1 or later version radio, and in some embodiments, the broadcast message can comply with a Bluetooth 5.1 or later version protocol.

In some embodiments, the processor of the door mounted contact sensor can determine whether the device identifier corresponds to any of the plurality of authorized devices enrolled with the security system by comparing the device identifier to a list of authorized identifiers stored in a memory of the door mounted contact sensor. However, in some embodiments, the processor of the door mounted contact sensor can determine whether the device identifier corresponds to any of the plurality of authorized devices enrolled with the security system by using the wireless radio or another transceiver to transmit the device identifier to a control panel of the security system and receive an enrollment signal from the control panel indicative of whether the device identifier corresponds to any of the plurality of authorized devices enrolled with the security system.

Similarly, in some embodiments, the processor of the door mounted contact sensor can determine whether the signal parameter satisfies the preconfigured access condition by parsing the broadcast message to identify the signal parameter, recalling the preconfigured access condition from the memory of the door mounted contact sensor or from the control panel, and comparing the signal parameter to the preconfigured access condition. However, in some embodiments, the processor of the door mounted contact sensor can determine whether the signal parameter satisfies the preconfigured access condition by using the wireless radio or the other transceiver to transmit the broadcast message or an indication of the signal parameter to the control panel and receive an access condition signal from the control panel indicative of whether the signal parameter satisfies the preconfigured access condition.

In some embodiments, the processor of the door mounted contact sensor can locally determine one of whether the device identifier corresponds to any of the plurality of authorized devices enrolled with the security system and the signal parameter satisfies the preconfigured access condition as described herein and determine another of whether the device identifier corresponds to any of the plurality of authorized devices enrolled with the security system and the signal parameter satisfies the preconfigured access condition by communicating with the control panel.

In some embodiments, the processor of the door mounted contact sensor can initiate the security action by using the wireless radio or the other transceiver to transmit information signals to the control panel indicative of the device identifier corresponding to any of the plurality of authorized devices enrolled with the security system and the signal parameter satisfying the preconfigured access condition or to transmit instruction signals to the control panel to perform the security action. However, in some embodiments, the processor of the door mounted contact sensor can directly initiate the security action by using the wireless radio or the other transceiver to transmit command signals to devices of the security system associated with the security action. Still further, in some embodiments, for example, when the control panel determines at least one of whether the device identifier corresponds to any of the plurality of authorized devices enrolled with the security system and the signal parameter satisfies the preconfigured access condition, the control panel can initiate the security action by transmitting the command signals to the devices of the security system associated with the security action and without transmitting any corresponding signals to the processor of the door mounted contact sensor.

In some embodiments, the security action can include disarming the security system. Additionally or alternatively, in some embodiments, the security action can include initiating execution of a task associated with disarming the security system. Additionally or alternatively, in some embodiments, the security action can include unlocking a door lock associated with the door mounted contact sensor.

As explained above, in some embodiments, the signal parameter can include the current moving direction of the wireless device, and in these embodiments, the preconfigured access condition can include a preconfigured moving direction associated with opening a door associated with the door mounted contact sensor, such as towards the door and/or outside of the door. Accordingly, the signal parameter can satisfy the preconfigured access condition when the current moving direction of the wireless device matches the preconfigured moving direction. In some embodiments, the current moving direction of the wireless device can be embedded in the broadcast message. Additionally or alternatively, in some embodiments, the processor of the door mounted contact sensor and/or the control panel can analyze the broadcast message to identify the current moving direction of the wireless device.

As also explained above, in some embodiments, the signal parameter can include the current distance of the wireless device from the wireless radio, and in these embodiments, the preconfigured access condition can include a preconfigured distance associated with opening the door associated with the door mounted contact sensor, such as any distance that would be considered proximate to the door. Accordingly, the signal parameter can satisfy the preconfigured access condition when the current distance is within the preconfigured distance, and in some embodiments, the preconfigured distance can be approximately one centimeter. In some embodiments, the current distance of the wireless device from the wireless radio can be embedded in the broadcast message. Additionally or alternatively, in some embodiments, the processor of the door mounted contact sensor and/or the control panel can analyze the broadcast message to identify the current distance of the wireless device from the wireless radio.

In embodiments in which the security action includes unlocking the door lock associated with the door mounted contact sensor, detecting the current moving direction of the wireless device or the current distance of the wireless device from the wireless radio as described herein can allow the security system to more accurately identify when a user of the wireless device is attempting to unlock the door lock as opposed to when the user is merely walking past the door or is not close enough to the door to safely unlock the door. Accordingly, the systems and the methods described herein can eliminate any need for an entry delay or an indicator that identifies when it is safe to enter a premises protected by the security system.

It is to be understood that the systems and the methods described herein can be used alone or in conjunction with any other security mechanism as would be understood by one of ordinary skill in the art to secure a region monitored by the security system, such as two-factor authentication or a passcode or a PIN to unlock or activate the wireless device.

FIG. 1 is a block diagram of a security system 20 according to disclosed embodiments. As seen in FIG. 1, in some embodiments, the security system 20 can include a contact sensor 22 mounted to a door 24, a control panel 26, and a wireless device 28. In some embodiments, the contact sensor 22 can be mounted in a door frame of the door 24, and in some embodiments, the contact sensor 22 can include a wireless radio 30 for communicating with the wireless device 28, a programmable processor 32, and a transceiver 34 for communicating with the control panel 26.

Figure 2:
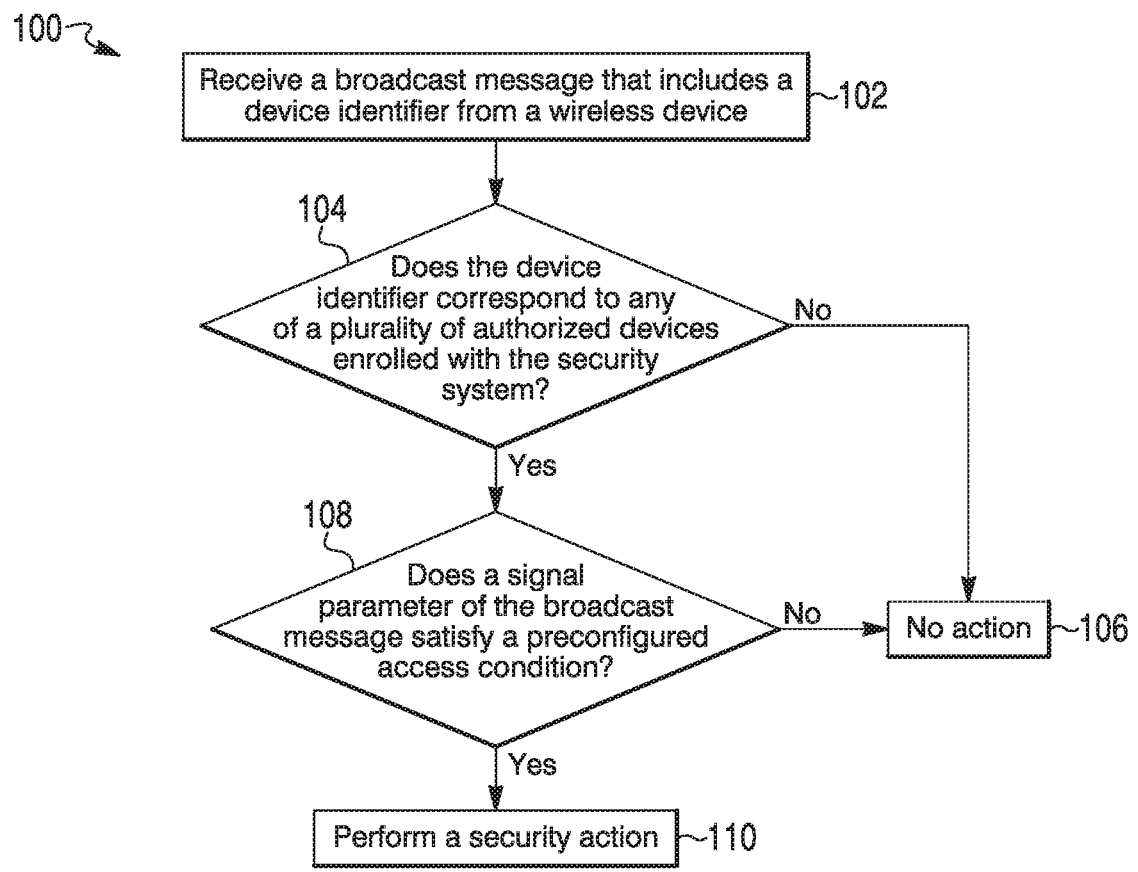
FIG. 2 is a flow diagram of a method in accordance with disclosed embodiments.

FIG. 2 is a flow diagram of one method 100 according to disclosed embodiments. As seen in FIG. 2, in some embodiments, the method 100 can include the wireless radio 30 receiving a broadcast message that includes a device identifier from the wireless device 28, as in 102. Then, the method 100 can include the programmable processor 32 determining whether the device identifier corresponds to any of a plurality of authorized devices enrolled with the security system 20, as in 104. If not, then the method 100 can terminate, as in 106. However, when the programmable processor 32 determines that the device identifier corresponds to at least one of the plurality of authorized devices enrolled with the security system 20, the method 100 can include the programmable processor 32 determining whether a signal parameter of the broadcast message satisfies a preconfigured access condition, as in 108. If not, then the method 100 can terminate, as in 106. However, when programmable processor 32 determines that the signal parameter satisfies the preconfigured access condition, the method 100 can include performing a security action, as in 110.

Figure 3:
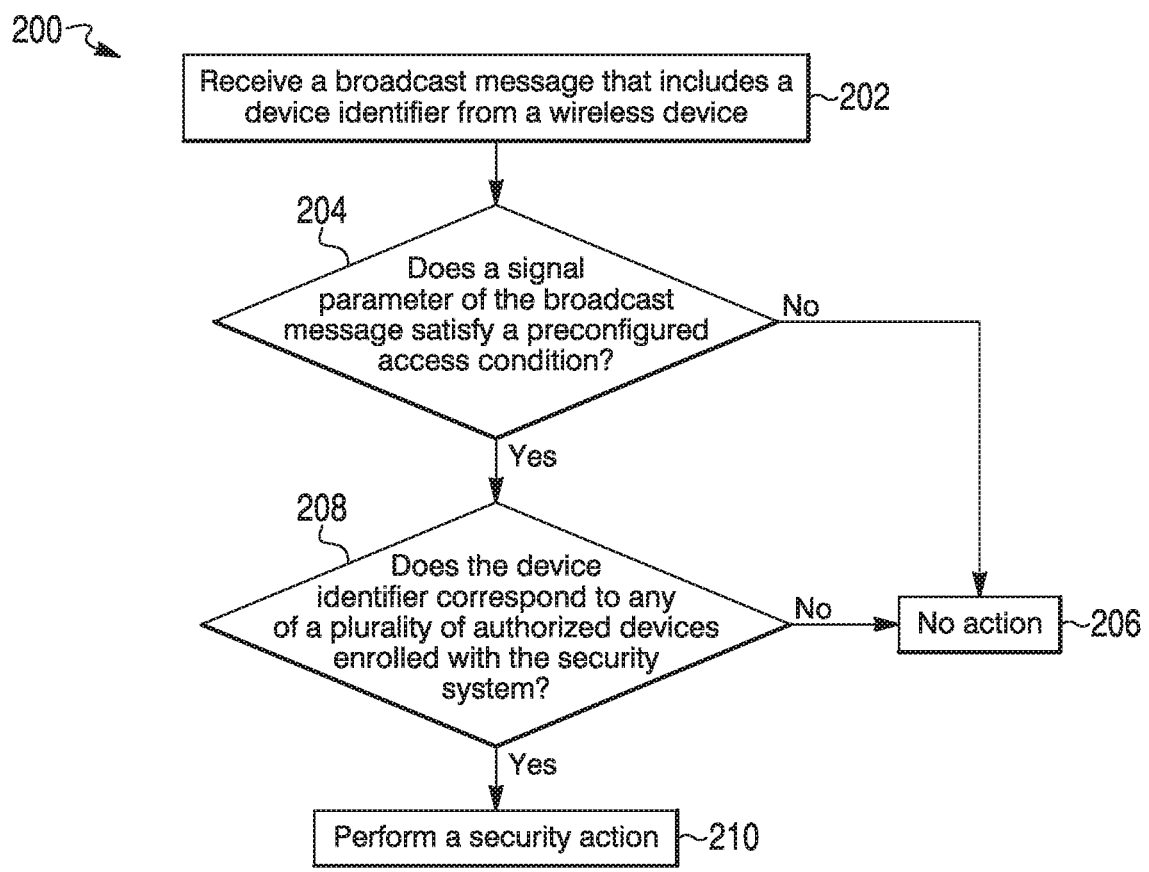
FIG. 3 is a flow diagram of a method in accordance with disclosed embodiments.

FIG. 3 is a flow diagram of another method 200 according to disclosed embodiments. As seen in FIG. 3, in some embodiments, the method 200 can include the wireless radio 30 receiving a broadcast message that includes a device identifier from the wireless device 28, as in 202. Then, the method 200 can include the programmable processor 32 determining whether a signal parameter of the broadcast message satisfies a preconfigured access condition, as in 204. If not, then the method 200 can terminate, as in 206. However, when the programmable processor 32 determines that the signal parameter satisfies the preconfigured access condition, the method 200 can include the programmable processor 32 determining whether the device identifier corresponds to any of the plurality of authorized devices enrolled with the security system 20, as in 208. If not, then the method 200 can terminate, as in 206. However, when the programmable processor 32 determines that the device identifier corresponds to at least one of the plurality of authorized devices enrolled with the security system, the method 200 can include performing a security action, as in 210.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:
1. A method comprising:
 a wireless radio of a door mounted contact sensor of a security system receiving a broadcast message that includes a device identifier from a wireless device;

determining whether the device identifier corresponds to any of a plurality of authorized devices enrolled with the security system;

determining whether a signal parameter of the broadcast message satisfies a preconfigured access condition, wherein the signal parameter includes a current moving direction of the wireless device, wherein the preconfigured access condition includes a preconfigured moving direction associated with opening a door associated with the door mounted contact sensor, and wherein the preconfigured moving direction includes a moving direction toward and outside of the door; and when the device identifier corresponds to any of the plurality of authorized devices enrolled with the security system and the signal parameter satisfies the preconfigured access condition by matching the current moving direction with the preconfigured moving direction, performing a security action comprising disarming the security system without providing an entry delay at the security system.

2. The method of claim 1 wherein the security action includes initiating execution of a task associated with disarming the security system.

3. The method of claim 1 wherein the security action includes unlocking a door lock associated with the door mounted contact sensor.

4. The method of claim 1 wherein the signal parameter further includes a current distance of the wireless device from the wireless radio, wherein the preconfigured access condition further includes a preconfigured distance associated with opening the door associated with the door mounted contact sensor, and wherein the signal parameter satisfies the preconfigured access condition when the current distance is within the preconfigured distance.

5. The method of claim 4 wherein the preconfigured distance is approximately one centimeter.

6. The method of claim 1 wherein the wireless device includes a Bluetooth radio, and wherein the broadcast message complies with a Bluetooth protocol.

7. The method of claim 1 further comprising:
a processor of the door mounted contact sensor determining whether the device identifier corresponds to any of the plurality of authorized devices enrolled with the security system; and
the processor of the door mounted contact sensor determining whether the signal parameter satisfies the preconfigured access condition.

8. The method of claim 1 further comprising:
a control panel of the security system determining whether the device identifier corresponds to any of the plurality of authorized devices enrolled with the security system; and
the control panel determining whether the signal parameter satisfies the preconfigured access condition.

9. A door mounted contact sensor of a security system comprising:
a wireless radio; and
a programmable processor,
wherein the wireless radio receives a broadcast message that includes a device identifier from a wireless device, and
wherein the programmable processor determines whether the device identifier corresponds to any of a plurality of authorized devices enrolled with the security system, determines whether a signal parameter of the broadcast message satisfies a preconfigured access condition, wherein the signal parameter includes a current moving direction of the wireless device, wherein the preconfigured access condition includes a preconfigured moving direction associated with opening a door associated with the door mounted contact sensor, and wherein the preconfigured moving direction includes a moving direction toward and outside of the door, and when the device identifier corresponds to any of the plurality of authorized devices enrolled with the security system and the signal parameter satisfies the preconfigured access condition by matching the current moving direction with the preconfigured moving direction, performs a security action comprising disarming the security system without providing an entry delay at the security system.

10. The door mounted contact sensor of claim 9 wherein the security action includes initiating execution of a task associated with disarming the security system.

11. The door mounted contact sensor of claim 9 wherein the security action includes unlocking a door lock associated with the door mounted contact sensor.

12. The door mounted contact sensor of claim 9 wherein the signal parameter further includes a current distance of the wireless device from the wireless radio, wherein the preconfigured access condition further includes a preconfigured distance associated with opening the door associated with the door mounted contact sensor, and wherein the signal parameter satisfies the preconfigured access condition when the current distance is within the preconfigured distance.

13. The door mounted contact sensor of claim 12 wherein the preconfigured distance is approximately one centimeter.

14. The door mounted contact sensor of claim 9 wherein the wireless radio and the broadcast message comply with a Bluetooth protocol.

15. The door mounted contact sensor of claim 9 further comprising:
a transceiver,
wherein the transceiver communicates with a control panel of the security system to initiate the security action.

16. The door mounted contact sensor of claim 9 further comprising:
a transceiver,
wherein the transceiver communicates with a control panel of the security system to determine whether the device identifier corresponds to any of the plurality of authorized devices enrolled with the security system and whether the signal parameter satisfies the preconfigured access condition.

* * * * *